United States Patent
Yeung

(10) Patent No.: US 9,040,153 B2
(45) Date of Patent: May 26, 2015

(54) METHOD OF REDUCING CEILING TILE SAG AND PRODUCT THEREOF

(75) Inventor: Lee K. Yeung, Vernon Hills, IL (US)

(73) Assignee: USG INTERIORS, INC., Chicago, IL (US)

( * ) Notice: Subject to any disclaimer, the term of this patent is extended or adjusted under 35 U.S.C. 154(b) by 172 days.

(21) Appl. No.: 13/490,937

(22) Filed: Jun. 7, 2012

(65) Prior Publication Data

US 2013/0330536 A1    Dec. 12, 2013

(51) Int. Cl.
| | |
|---|---|
| B32B 3/26 | (2006.01) |
| B32B 13/14 | (2006.01) |
| C04B 28/14 | (2006.01) |
| C04B 41/50 | (2006.01) |
| E04B 9/04 | (2006.01) |
| C04B 41/00 | (2006.01) |
| C04B 111/00 | (2006.01) |

(52) U.S. Cl.
CPC ............ *B32B 13/14* (2013.01); *C04B 28/14* (2013.01); *C04B 41/5085* (2013.01); *E04B 9/045* (2013.01); *B32B 2262/108* (2013.01); *B32B 2419/00* (2013.01); *C04B 2111/00094* (2013.01); *C04B 2111/00603* (2013.01); *C04B 2111/00612* (2013.01); *C04B 41/009* (2013.01)

(58) Field of Classification Search
CPC .... C04B 28/14; C04B 14/185; C04B 14/204; C04B 14/28; C04B 18/241; C04B 24/2641; C04B 24/2647; C04B 41/009; C04B 41/5058; C04B 2103/12; C04B 2103/22; C04B 2111/00094; C04B 2111/00603; C04B 2111/00612; B32B 13/14; B32B 19/02; B32B 2262/108; B32B 2419/00; E04B 9/045
USPC ................ 428/313.7, 317.9; 106/772, 638
See application file for complete search history.

(56) References Cited

U.S. PATENT DOCUMENTS

| | | | |
|---|---|---|---|
| 3,908,062 A * | 9/1975 | Roberts | 442/320 |
| 4,942,085 A | 7/1990 | Guerro et al. | |
| 5,320,677 A | 6/1994 | Baig | |
| 5,753,871 A | 5/1998 | Kahara et al. | |
| 6,379,458 B1 * | 4/2002 | Immordino et al. | 106/772 |
| 6,740,395 B2 | 5/2004 | Halm et al. | |
| 7,364,015 B2 | 4/2008 | Englert et al. | |
| 7,503,430 B2 | 3/2009 | Englert et al. | |
| 7,732,043 B2 * | 6/2010 | Baig et al. | 428/292.1 |
| 7,851,052 B2 | 12/2010 | Caldwell | |
| 2002/0112651 A1 | 8/2002 | Yu et al. | |
| 2004/0039098 A1 | 2/2004 | Belmares et al. | |
| 2004/0231916 A1 | 11/2004 | Englert et al. | |
| 2007/0055012 A1 | 3/2007 | Caldwell | |
| 2007/0059513 A1 | 3/2007 | Yu et al. | |
| 2007/0082170 A1 | 4/2007 | Colbert et al. | |
| 2008/0060871 A1 | 3/2008 | Englert et al. | |
| 2009/0263673 A1 * | 10/2009 | Yeung et al. | 428/500 |
| 2010/0256293 A1 | 10/2010 | Lu | |
| 2011/0319543 A1 | 12/2011 | Carbo et al. | |

* cited by examiner

*Primary Examiner* — Hai Vo
(74) *Attorney, Agent, or Firm* — Greer, Burns & Crain, Ltd.; Brian M. Wishnow; Philip T. Petti

(57) ABSTRACT

Sag in ceiling tiles is reduced by the present coated ceiling tile and method which decreases sag in the coated ceiling tiles. Calcined gypsum and water are combined to form a coating which is applied to the back side of a base ceiling tile in a thin layer of about 100 micrometer to about 1000 micrometers. The coating optionally includes a set time modifier. This method makes a coated ceiling tile from a base ceiling tile having a front side and a back side opposing the front side. The coating is applied to the back side of the base ceiling tile, the coating comprising an interlocking matrix of calcium sulfate dihydrate. Optionally, remnants of the set time modifier are present within interstices in the gypsum matrix. The remnants of the set time molecule include ions, molecules, particles or combinations thereof.

5 Claims, No Drawings

METHOD OF REDUCING CEILING TILE SAG AND PRODUCT THEREOF

FIELD OF THE INVENTION

This invention relates to a method of reducing sag of a mineral wool ceiling tile and a product thereof. More specifically, a gypsum-based coating is applied to the back side of the ceiling tile to reduce sag while maintaining acoustical properties.

BACKGROUND OF THE INVENTION

This invention is related to acoustical or ceiling panels. Acoustical tiles, also known as acoustical panels, ceiling tiles or ceiling panels, are well known in the building trades for providing a ceiling that is quickly installed, inexpensive and lightweight. The tiles are prepared from a slurry of fillers and binders, most frequently by either a casting process or a felting process.

In the water felting of such a slurry, a dispersion of a filler, a binder and other ingredients flow onto a moving, porous support, such as that of a Fourdrinier or Oliver mat forming machine for dewatering. The dispersion dewaters first by gravity and then vacuum suction means. The wet basemat is dried in heated convection drying ovens and the dried material is cut to the desired dimensions and optionally top coated, such as with paint, to produce acoustical tiles and panels.

Acoustical tile is also made by a wet pulp molded or cast process such as that described in U.S. Pat. No. 1,769,519. A molding composition that includes fibers, fillers, colorants and a binder is prepared for molding or casting the body of the tile. This mixture is placed upon suitable trays which have been covered with paper or a metallic foil and then the composition is screeded to a desired thickness with a screed bar or roller. A decorative surface, such as elongated fissures, may be provided by the screed bar or roller. The trays filled with the pulp are then placed in an oven to dry or cure the composition. The dried sheets are removed from the trays and may be treated on one or both faces to provide smooth surfaces, to obtain the desired thickness and to prevent warping. The sheets are then cut into tiles of a desired size.

Mineral wool is often used as the fiber in ceiling tiles. Optionally, the mineral wool is combined with cellulosic fiber, such as recycled paper fibers. Strength of the ceiling tile panel comes from interlacing of the fibers together with the action of the binder. Although these mechanisms result in a ceiling tile that bears its own weight, the tile is subject to sag over time (years) or when exposed to high temperatures and/or high humidity.

Sag is also more likely to occur because ceiling tiles are normally installed in a horizontal position. This accentuates the effects of gravity. While the edges of the tile are supported, the center of the tile is held in place only by the integrity of the mineral wool matrix from which the tile is made. Over time, gravity tends to pull the interlaced mineral wool fibers apart, weakening the matrix and reducing the dimensional stability. When ceiling tiles bear the weight of insulation above them, or when they are subject to fluctuations in temperature and humidity, such as in a bathroom, an unsightly sag in the tiles can develop.

SUMMARY OF THE INVENTION

Sag in ceiling tiles is reduced by the present coated ceiling tile and method which decreases sag in the ceiling tiles. Calcined gypsum and water are combined to form a slurry which is applied as a coating to the back side of a base ceiling tile in a thin layer of about 100 micrometer to about 1000 micrometers. This coating has been found to be effective for maintaining dimensional stability without significant loss in sound attenuation even when applied as a layer less than one millimeter in thickness. The coating may include a number of optional components, such as a set time modifier.

Application of gypsum-based compounds to building materials, such as plaster or joint compounds, are not known for their ability to maintain sound attenuation. Set gypsum is normally sufficiently hard that it reflects sound. In an occupied room, this would add to the noise in the room as it would echo sounds generated within the room. However, Applicant has found that, when applied as a thin layer to the back side of the base ceiling tile, the coating maintains the acoustical properties of the ceiling tile. The thinness of the coating allows sound to be absorbed by the coated ceiling tile, not reflected back into the occupied room. It is surprising that a coating so thin is able to provide sufficient support to the coated ceiling tile that sag is reduced.

The coating is also easily applied to the back side of any base ceiling tile or acoustical panel by any known means. In some embodiments, the coating is sprayed onto the tile. In other embodiments, the coating is screeded onto the tile. Other optional methods of applying the coating include flood-coating the back of the base ceiling tile, or roller applying the back side of the base panel with the gypsum slurry.

This method makes a coated ceiling tile from a base ceiling tile having a front side and a back side opposing the front side. A coating from about 100 micrometers to about 1000 micrometers in thickness is applied to the back side of the base ceiling tile, the coating comprising an interlocking matrix of calcium sulfate dihydrate crystals. If the set time modifier is added to the slurry from which the coating is made, remnants of the set time modifier are present within interstices in the gypsum matrix. The remnants of the set time molecule include ions, molecules, particles or combinations thereof that are present in the coating slurry as the calcium sulfate hemihydrate in the slurry is hydrated to form the calcium sulfate dihydrate crystal matrix.

DETAILED DESCRIPTION OF THE INVENTION

Preparation of a slurry, its application to a base ceiling tile and the resulting coated ceiling tile are described in terms of spraying the slurry on a back side of the base ceiling tile. This is but one embodiment of the method of reducing sag of a ceiling tile and is not intended to be limiting. As used in this application, the base ceiling tile has a front side that is visible by occupants of a room when the coated ceiling tile is installed in a room. The back side of the base ceiling tile is the side opposing the front side and usually faces the studs, insulation or other support substrate materials as installed. Often, but not necessarily, the front side of the base ceiling tile has a smoother finish than the back side of the tile.

The base ceiling tile can be any acoustical tile. In some embodiments, the base ceiling tile is made by a casting or felting process, although any process of preparing the base tile can be used. Examples of suitable base ceiling tiles include Frost®, Glacier® and Arctic ClimaPlus® cast acoustical panels and Radar®, Olympic II® or Cross-Fissured wet-felted ceiling tiles. The coating of the present invention can be applied to vertical panels or other acoustical panels, however, due to the way the panel is used, sag is not normally encountered in those applications.

In some embodiments, the base ceiling tile may be obtained by felting a slurry of fibers, a binder and other components as described above. The fibers include, but are not limited to, mineral wool fibers, glass fibers, organic polymer fibers, cellulosic fibers and mixtures thereof. It is assumed for the remainder of this description that the base ceiling tile is a finished product prior to application of the coating and that the process by which the base ceiling tile is obtained is unimportant.

Hereafter, "the slurry" refers to the coating slurry. After creation of the slurry, it is applied to the base ceiling tile by any coating means that can be used to apply the coating at a thickness of from about 100 micrometers to about 1000 micrometers. In some embodiments, the coating thickness is from about 100 micrometers to about 400 micrometers. Still other embodiments feature a coating thickness of about 100 micrometers to about 200 micrometers or from about 400 micrometers to about 1000 micrometers.

Calcined gypsum, also known as calcium sulfate hemihydrate or stucco, is a major component of the coating and acts as a binder. In some embodiments, about 50% to about 100% of the solids added to the slurry are calcined gypsum in either the alpha or beta form, however, the amount of calcined gypsum can range from about 10% to about 100% of the solids. The binder is free of volatile organic components, including formaldehyde compounds.

An optional set time modifier acts to change the time needed for the calcined gypsum to hydrate. Setting reactions convert the calcium sulfate hemihydrate to calcium sulfate dihydrate, also known as gypsum, by hydration with water. There are at least two mechanisms by which the set time modifier acts. The set modifier can change the induction period. This is the initial portion of a chemical reaction that is characterized by a very slow rate of reaction. Set time modifiers can be selected to lengthen or shorten the induction period. Following the induction period, the reaction rate accelerates. The set modifier can also be selected to increase or decrease the rate of reaction that follows the induction period.

Set accelerators, set retarders or combinations thereof can be selected as the set time modifier. Combinations are used in situations where it is beneficial to delay the start of hydration reactions, but once started, to accelerate the reaction rates. For example, when applied using a sprayer having a nozzle, particles of the gypsum matrix can accumulate at or in the nozzle. When sufficient gypsum has accumulated, it can clog the sprayer, thereby requiring that the manufacturing line be shut down so that the nozzle can be cleaned or replaced. Adjustment of the induction period can prevent clogging of the sprayer, failure of the coating to adhere to the tile or lengthening time on a production line to allow a slow setting slurry to cure.

Set retarders are used when it is necessary to delay the initial onset of the hydration reactions until after the slurry has passed through the sprayer or slurry application apparatus. In some embodiments, the set retarder is selected to lengthen the induction period until the slurry passes through the sprayer, however it is also contemplated to use set retarders that decreases the reaction rate. Examples of useful set retarders include carboxylic compounds such as citric acids, acetic acids, tartaric acids, polyacrylate polymers, co-polymers, derivatives and their conjugate base carboxylate salts. Other set retarders include mono- and polyphosphonic compounds, such as phosphoric acid and hexamethylene diamine tetra (methylene phosphonic acid), as well as the conjugate base mono and poly phosphate compounds such as pyrophosphate, meta phosphate and orthophosphate. These are used in amounts necessary to keep the sprayer free of set gypsum. In at least one embodiment, the set retarders are used in amounts of about 0.001% to about 1% based on the weight of the slurry solids.

After the slurry has passed through the sprayer, it may be advantageous to add a set accelerator to speed up the hydration reactions. Set accelerators are used in amounts of about 0.001% to about 1%. Unless otherwise noted in this application, amounts, percentages or ratios are given on a weight basis of the solids. Examples of suitable set accelerators include calcium sulfate dihydrate particles, either as natural landplaster or landplaster co-ground with a starch such as sugar. HRA, described in U.S. Pat. No. 2,078,199, herein incorporated by reference, is landplaster co-ground with sugar. Another accelerator, CSA, described in U.S. Pat. No. 3,573,947, herein incorporated by reference, is HRA that is further heated so that the sugar coating melts over the surface of the landplaster. Other set accelerators include aluminum and zinc salts, such as aluminum sulfate salts, zinc chloride and zinc sulfate salts.

Water is added to the calcined gypsum to make the slurry and initiate hydration reactions. Sufficient water should be added to make a flowable slurry or to give the slurry a consistency suitable for the chosen application method. Some embodiments add water to achieve a consistency of from about 40 to about 90. The "consistency" of a calcined gypsum slurry is defined as the number of grams of water used per 100 grams of calcined gypsum. In other embodiments, the consistency varies from about 50 to about 70.

A number of optional components can also be present in the slurry. If these components are dry components, they can be added to other dry ingredients, such as the calcined gypsum, prior to addition to the water. Alternately, they can be combined with other components in the wet slurry. Optional liquid components can either be combined with other liquid components or added directly to the slurry.

Flow properties of the coating are optionally changed using a rheology modifier. It may be desirable, for example, to increase the flowability of the slurry so that a very thin coating is applied to the back side of the ceiling tile. Examples of rheology modifiers include dispersants or surfactants. When used, the rheology modifiers are used in amounts of from about 0.01 to about 0.5% based on the dry weight of calcined gypsum. In other embodiments, the dispersant is used in amounts of from about 0.05% to about 0.2% on the same basis.

Polycarboxylate dispersants are used to reduce the viscosity of the gypsum slurry. The polycarboxylate dispersant includes one or more carboxylate or carboxylic acid repeating units. Examples of suitable repeating units are vinyl groups, acrylic groups, maleic acid groups, and the like. Useful copolymers are polymers that include two or more repeating units that can be arranged in any order along the length of the polymer chain. The dispersant is preferably a comb-branched polyether polycarboxylate. In this arrangement, long chain repeating units are separated by one or more shorter repeating units. Any polycarboxylate having dispersant properties appropriate to the feed material is usable in this invention.

Particularly preferred polycarboxylates have at least three repeating units; an acrylic unit, a maleic acid repeating unit and a long-chain polyether repeating unit. Polycarboxylates of this type are disclosed in U.S. Pat. No. 6,777,517, herein incorporated by reference and hereafter referenced as the "2651-Type Dispersant." The 2651-Type Dispersant has been found to be especially effective in reducing the viscosity of the slurry as it passes through the comminution device.

These dispersants are marketed under the names MELFLUX 2641, MELFLUX 2651 and MELFLUX 3L (BASF Construction Polymers GmbH, Trostberg, Germany). High dispersion efficacy allows reduction of the amount of dispersant to be used. This is beneficial to process economics since polycarboxylate components are relatively expensive. It is anticipated that any comb-branched polycarboxylate would be useful in this process. Other useful commercially available dispersants include MELFLUX 1641 (BASF Construction Polymers GmbH, Trostberg, Germany).

A density modifier is optionally added to the slurry to change the density of the finished ceiling tile. In some embodiments, the density modifier is a lightweight filler that reduces the coating density, thereby reducing the overall tile weight. Examples of density modifiers include expanded perlite and expanded vermiculite. The density modifiers, if present, are used in amounts of about 1% to about 10% based on dry solids weight. At least one embodiment combines the density modifier with the calcined gypsum prior to addition to the slurry.

The components are combined to prepare the back side slurry coating. In some embodiments, a high-speed mixer, such as a pin mixer, is used to prepare the slurry. Projections, similar to nails or pins, are attached to a rotating cylinder. As the cylinder rotates swiftly, turbulence is generated within the mixer, incorporating all of the components into a homogeneous slurry.

Any of several methods are useful in applying this coating. A conventional sprayer can be used to spray the coating onto the back side of the base ceiling tile. In some embodiments, the slurry is applied to the back side of the base tile with a roller. Still other embodiments flood the back side of the base ceiling tile with the slurry to coat it. In yet another embodiment, the calcined gypsum slurry is screeded onto the back side of the base ceiling tile. Any application method can be used that applies the calcined gypsum slurry to the specified thickness and many additional coating methods will become apparent to one of ordinary skilled in the art as the coating is applied.

Specialized slurry spray machines have also been developed for spraying the calcined gypsum slurry. In one such machine, described in U.S. Pat. No. 6,273,345, herein incorporated by reference, after exiting the spray nozzle, the set accelerator is contacted with the slurry to hasten the hydration reactions. The slurry spray machine for spraying a settable slurry includes a main passageway configured for receiving a supply of pressurized slurry and having a supply end and an outlet end opposite the supply end. A first compressed gas inlet is disposed intermediate the supply and outlet ends and in fluid communication with the passageway for introducing a first supply of pressurized gas into the slurry, and a second pressurized gas inlet is disposed closer to the outlet end than the first inlet and in fluid communication with the passageway for introducing a second supply of pressurized gas into the slurry. A pressurized supply of adjuvant is provided in fluid communication with the second pressurized gas inlet for providing a blended gas to the second gas inlet. At least one valve is provided for controlling the flow of slurry through the passageway and the flow of the first and second gases into the passageway. Prior to the pressurized ejection of the slurry from the outlet end, the first gas is injected into the slurry, and the blended gas is mixed with the slurry and the first pressurized gas between the first gas inlet and the outlet end.

After application of the back side slurry coating, it is allowed to set and dry. The coating sets at room temperature. However, in a commercial setting, it may be desirable to heat the coated ceiling tile in an oven or kiln to drive off excess water that may be present in the interstices of the gypsum matrix of the coating.

The coated product includes a thin coating of calcium sulfate dihydrate crystals interlocked to form a crystalline matrix. Remnants of the set time modifier may remain in the interstices of the matrix. "Remnants" of the set time modifier include small particles of the set time modifier, whole molecules thereof or products of dissociation or reaction of the set time modifier. For example, where the set time modifier is an ionic compound, such as aluminum sulfate, dissociation of the compound is likely to leave aluminum ions within the matrix. Other set time modifiers act as catalysts, and are not changed by interaction with the set time modifier, and will be present in the coating as whole molecules or particles.

EXAMPLE 1

The concept of using a thin coating of calcined gypsum to the back surface of a ceiling tile was tested using 3 inch by 24 inch (7.6 cm by 61.0 cm) strips of a base ceiling tile. All test strips were sprayed with water to wet them. In Table 1 below, Samples 1-4 were dusted with dry calcined gypsum powder sieved through a 30 mesh screen, then sprayed with water to form the coating. Samples 5-8 used a coating slurry made by combining the calcined gypsum with water. The coating slurry was screeded onto the back surface of each of the sample strips in this group. Coated samples 1-8 were allowed to set for one hour prior to testing. Four of the strips were left uncoated (Samples 9-12) as control samples.

Testing of the samples included placing the test strips inside a chamber where temperature and humidity are controlled. The strips were supported lengthwise by the 3-inch (7.6 cm) sides with the back side (coated side, if present) facing toward the top of the chamber. Conditions within the chamber were maintained at 104° F. (40° C.) at 95% humidity for 12 hours, then the temperature was reduced to 70° F. (21° C.) at 50% humidity and maintained for 12 hours. The test strips were subjected to three cycles described above.

TABLE 1

| Sample | Application Type | Dry Strip Weight, g | Wet Strip Weight, g | Dry Coating Weight, g/sf (g/m²) | Calculated Coating Thickness, μm | Total Movement, in (mm) | Position Relative to a Flat Plane, in (mm) |
|---|---|---|---|---|---|---|---|
| 1-1 | Spray dry stucco | 121.80 | 144.15 | 44.7 (430) | 258 | 0.127 (3.22) | 0.034 (0.86) |
| 1-2 | Spray dry stucco | 121.41 | 153.50 | 64.2 (617) | 370 | 0.014 (0.36) | −0.143 (−3.63) |
| 1-3 | Spray dry stucco | 121.51 | 152.71 | 62.4 (600) | 360 | 0.012 (0.30) | −0.194 (−4.93) |
| 1-4 | Spray dry stucco | 121.14 | 151.64 | 61.0 (586) | 352 | 0.014 (0.36) | −0.164 (−4.17) |
| 1-5 | Screed slurry | 121.46 | 141.84 | 40.8 (392) | 235 | 0.164 (4.17) | −0.017 (−0.43) |

TABLE 1-continued

| Sample | Application Type | Dry Strip Weight, g | Wet Strip Weight, g | Dry Coating Weight, g/sf (g/m²) | Calculated Coating Thickness, μm | Total Movement, in (mm) | Position Relative to a Flat Plane, in (mm) |
|---|---|---|---|---|---|---|---|
| 1-6 | Screed slurry | 121.82 | 151.64 | 43.9 (422) | 253 | 0.094 (2.39) | −0.123 (−3.12) |
| 1-7 | Screed slurry | 121.74 | 138.47 | 33.5 (322) | 193 | 0.190 (4.83) | 0.072 (1.83) |
| 1-8 | Screed slurry | 121.05 | 136.22 | 30.3 (291) | 175 | 0.232 (5.89) | 0.136 (3.45) |
| 1-9 | No coating | | | 0.0 | | 1.443 (36.65) | 1.432 (36.37) |
| 1-10 | No coating | | | 0.0 | | 1.900 (48.26) | 1.870 (47.50) |
| 1-11 | No coating | | | 0.0 | | 1.881 (47.78) | 1.857 (47.17) |
| 1-12 | No coating | | | 0.0 | | 1.881 (47.78) | 1.883 (47.83) |

The above data demonstrates that a very thin plaster coating on the back side of the base ceiling tile is effective in limiting the amount of movement of the tile, thereby reducing sag. The control samples with no coating averaged movement of 1.77 inches (44.9 cm) over the three cycles of the test. Of the coated samples, Sample 8, having the highest total movement of any of the coated samples, measured only 0.232 inches of movement. Movement was measured using a gauge that measures the vertical position of a piston at rest on the surface of the panel. Perfect flatness is defined as "0". Measurements are made before and after the test to ensure that, during the test, the sample was sagging of its own weight and not that of the piston.

Further, the tests show that the method of coating the base ceiling tile produced little, if any, change in the ability of the coated ceiling tile to withstand sag. For example, samples 1 and 6 have almost the same coating weight applied by, respectively, spray drying and screeding. Both samples resulted in very little movement of the test strip. Movement of the strips appeared to depend more on the coating thickness of the sample than the method used to coat the strip.

EXAMPLE 2

A powder mixture was prepared by combining 2000 grams of beta-calcined gypsum (#2 Moulding Plaster, USG Corporation, Chicago, Ill.) with 6 grams of HRA set accelerator. 400 grams of the powder mixture was combined with 240 grams of water to make a coating slurry. Prior to coating, each test panel was prewet with about 73 g of water. Each test panel was a full 2 ft by 4 ft base ceiling tile panel (61 cm by 122 cm) that was coated with the coating slurry using a manual coating system at levels indicated in Table II below. The test panels were allowed to set at room temperature and appeared to be brittle set in 30 minutes. "Brittle set" is also known as a "hard set." It is the point when the slurry is no longer pliable, but breaks or fractures rather than moves. At this point the coating has achieved nearly full mechanical strength. The coating thickness was an estimated average of 155 micrometers. The coating thickness was a calculated estimate because the ceiling panel substrate surface is not smooth and uniform. The thickness was determined by confocal microscopy in a small area of the sample. A ratio of the thickness to the weight of the coating per a square foot was determined and used to calculate the coating thickness of the rest of the sample series using the weight of the coating per a square foot.

The test panels were placed in a temperature and humidity controlled environment. From 70° F. (21° C.) and 50% humidity, the temperature was raised from 70° F. to 100° F. (37.8° C.) at 90% relative humidity and maintained for 12 hours, then reduced to 70° F. (21° C.) at 50% humidity and maintained for 12 hours. This cycle was repeated three times prior to measurement of the strip movement. Movement was measured as in Example 1.

TABLE 2

| Sample | Panel Weight, g | Wet Panel Weight, g | Dry Coating Weight, g/sf (g/m²) | Calculated Coating Thickness, (μm) | Total Movement, in (mm) | Position Relative to a Flat Plane, in (mm) |
|---|---|---|---|---|---|---|
| 2-1 | 2414 | 4372 | 28.38 (272.7) | 175 | 0.283 (7.19) | 0.356 (9.04) |
| 2-2 | 2328 | 4499 | 16.00 (153.8) | 99 | 0.704 (17.88) | 0.941 (23.90) |
| 2-3 | 2493 | 4394 | 37.00 (355.6) | 228 | 0.192 (4.88) | 0.151 (3.84) |
| 2-4 | 2348 | 4364 | 20.75 (199.4) | 128 | 0.659 (16.74) | 0.880 (22.35) |
| 2-5 | 2386 | 4390 | 23.88 (229.5) | 14 | 0.607 (15.42) | 0.881 (22.38) |
| 2-6 | | | 0.0 | | 1.380 (35.05) | 1.435 (36.45) |
| 2-7 | | | 0.0 | | 1.279 (32.49) | 1.331 (33.81) |
| 2-8 | | | 0.0 | | 1.251 (31.78) | 1.296 (32.92) |

Compared to samples 2-6 through 2-8 having no coating, movement of the coated samples 2-1 through 2-5 was significantly decreased. This example confirmed that the effect was applicable to full-sized ceiling tile panels.

EXAMPLE 3

In this example, the coating was applied to the smooth or front side of the test strip samples to see if the wire-mark pattern on the back of the strips contributed to the sag resistance performance. Samples were made from 400 grams of calcined gypsum to which 0.14 grams of HRA set accelerator had been added. To this stucco, 240 grams of water was added to form a calcined gypsum slurry. Strips 3 inches by 24 inches (7.6 cm by 61.0 cm) were coated and allowed to set until firm. The strips were placed with the coating side up in the testing chamber used in Examples 1 and 2, and measured before and after the complete cycle.

From 70° F. (21.1° C.) and 50% humidity, the temperature and humidity were increased to 100° F. (37.8° C.) with 90% humidity and maintained for 12 hours. The temperature was then decreased to 70° F. (21.1° C.) and 50% humidity and maintained there for another 12 hours. These temperatures and humidities were repeated for a total of three cycles.

TABLE 3

| Sample | Dry Strip Weight, g | Wet Strip Weight, g | Dry Coating Weight, g/sf (g/m²) | Total Movement, in (mm) | Position Relative to a Flat Plane, in (mm) |
|---|---|---|---|---|---|
| 3-1 | 137.0 | 236.2 | 37.8 (363) | 0.294 (7.47) | 0.127 (3.23) |
| 3-2 | 190.2 | 236.2 | 144.2 (1386) | 0.193 (4.90) | −0.184 (−4.67) |
| 3-3 | 140.0 | 235.8 | 44.2 (425) | 0.286 (7.26) | 0.041 (1.04) |
| 3-4 | 131.8 | 236.8 | 27.2 (261) | 0.164 (4.17) | −0.006 (−0.15) |
| 3-5 | | | 0.0 | 1.661 (42.19) | 1.663 (42.24) |
| 3-6 | | | 0.0 | 1.559 (40.00) | 1.600 (40.64) |

Sag resistance of test strips 3-1 through 3-4 was comparable to the sag resistance of the coated strips of Example 1. This confirms that neither the wire-mark pattern on the back of the strips nor the smooth finish on the ceiling tile surface significantly contributed to the sag resistance.

EXAMPLE 4

Comparative Example

A test strip was prepared as in Example 3 with the coating applied to the smooth front facing. When placed in the test chamber, the coating faced downward into the chamber. This sample was then subjected to the same test cycle as the previous examples.

At the conclusion of the test cycle, the test strip demonstrated approximately the same sag as the uncoated strips of the previous examples. This test confirmed that the coating is effective only when applied to the back side of the ceiling tile, not the front side of the tile.

The above examples demonstrate the coated ceiling tile and method of reducing sag compared to the base ceiling tile having no coating. Use of ceiling tiles having a wire-mark pattern was shown to have no effect on the ability of the coated ceiling tiles and method to reduce sag. The importance of applying the coating to the back side of the base ceiling tile was shown in Example 4.

While particular embodiments of the method of reducing sag in a ceiling tile and an improved coated ceiling tile have been shown and described, it will be appreciated by those skilled in the art that changes and modifications may be made thereto without departing from the invention in its broader aspects and as set forth in the following claims.

What is claimed is:

1. A coated ceiling tile with increased dimensional stability, the coated ceiling tile comprising:
    a base ceiling tile having a front side and a back side opposing said front side, wherein the front side is facing inside of a room after installation and is visible to occupants of the room; and
    a thin coating from about 100 micrometers to about 1000 micrometers in thickness applied to said back side, said thin coating consisting of an interlocking matrix of calcium sulfate dihydrate crystals, and
    wherein the back side thin coating reduces sagging of the coated ceiling tile while allowing sound to be absorbed by the coated ceiling tile, not reflected back into an occupied room, and
    wherein the front side is free of the thin coating.

2. The coated ceiling tile of claim 1 wherein said coating is applied to a thickness of about 100 micrometers to about 400 micrometers.

3. The coated ceiling tile of claim 1 wherein said base ceiling tile comprises mineral wool.

4. The coated ceiling tile of claim 1 wherein said coated ceiling tile is free of volatile organic compounds.

5. The pre-made coated ceiling tile with increased dimensional stability of claim 1, wherein the back side thin coating reduces the sagging of the coated ceiling tile by at least 10%.

* * * * *